(12) United States Patent
Gurtler

(10) Patent No.: US 7,152,870 B2
(45) Date of Patent: Dec. 26, 2006

(54) GOOSENECK TRAILER HITCH

(76) Inventor: Wendell A. Gurtler, 315 Western Ave., Iowa Falls, IA (US) 50126

( * ) Notice: Subject to any disclaimer, the term of this patent is extended or adjusted under 35 U.S.C. 154(b) by 0 days.

(21) Appl. No.: 11/342,200

(22) Filed: Jan. 27, 2006

(65) Prior Publication Data

US 2006/0170192 A1    Aug. 3, 2006

Related U.S. Application Data

(62) Division of application No. 10/973,903, filed on Oct. 26, 2004, now abandoned.

(51) Int. Cl.
B60D 1/50    (2006.01)
(52) U.S. Cl. .............. 280/483; 280/489; 280/495.1; 280/901
(58) Field of Classification Search ........... 280/491.5, 280/901, 483, 489
See application file for complete search history.

(56) References Cited

U.S. PATENT DOCUMENTS

| | | | |
|---|---|---|---|
| 4,253,679 A * | 3/1981 | Sargent | 280/405.1 |
| 5,016,898 A | 5/1991 | Works | |
| 5,513,869 A | 5/1996 | Putnam | |
| 5,823,560 A | 10/1998 | Van Vleet | |
| 5,851,021 A | 12/1998 | Van Kley | |
| 5,887,884 A | 3/1999 | Smith | |
| 6,494,478 B1 | 12/2002 | MacKarvich | |
| 6,698,785 B1 | 3/2004 | Peters | |
| 2002/0053782 A1 * | 5/2002 | Peters | 280/504 |
| 2003/0178811 A1 | 9/2003 | Buckner | |
| 2004/0227326 A1 | 11/2004 | Peters | |

* cited by examiner

Primary Examiner—Kevin Hurley
(74) Attorney, Agent, or Firm—Sturm & Fix LLP

(57) ABSTRACT

A trailer hitch having an assembly housing that is mounted to the bed of a vehicle, the assembly housing receiving a ball hitch that extends out of the top of the assembly housing, and a torsion bar disposed within the assembly housing to dampen the vibration of the trailer from transferring to the vehicle.

13 Claims, 5 Drawing Sheets

GOOSENECK TRAILER HITCH

CROSS-REFERENCE TO RELATED APPLICATIONS

This application is a Divisional of U.S. patent application Ser. No. 10/973,903 filed Oct. 26, 2004 now abandoned, entitled GOOSENECK TRAILER HITCH, and is incorporated herein by reference in its entirety.

BACKGROUND OF THE INVENTION

The present invention relates to a trailer hitch and, more specifically, a trailer hitch for a gooseneck trailer that prevents vibration and other erratic motion from the trailer from transferring to the vehicle during travel.

Wheeled trailers are frequently towed behind vehicles to transport various items including boats, campers, horses, and other cargo. Many types of hitches have been developed to receive and tow a wheeled trailer.

A disadvantage of conventional trailer hitches is that uneven road surfaces cause vibration resulting in wear and damage to the trailer hitch. Additionally, the vibration and erratic motion from the trailer tends to transfer through the hitch to the vehicle, thereby affecting the vehicle's performance. This problem is only exaggerated when the trailer is empty or hauling a light load. When the trailer is unloaded, bumps in the road will cause the trailer to pitch and move in an erratic fashion, pulling the vehicle from side to side.

For gooseneck trailers, a few attempts have been made to solve this problem. For example, U.S. Pat. No. 5,851,021 by Van Kley discloses a complicated linkage assembly to reduce shocks that can be transmitted during towing, especially during starting or stopping on rough roads. The disadvantage of the Van Kley device is that it is difficult to assemble and costly to manufacture. Other trailers have been developed that include shock absorbers and other dampening devices for reducing the vibration and erratic motion of the trailer, particularly when the trailer is unloaded. One such example is U.S. Pat. No. 5,887,884 to Smith, which teaches a trailer having a shock absorber. The disadvantage with trailers such as the Smith apparatus is that a consumer must upgrade any conventional trailers to include the shock absorbers taught by Smith. This can be costly, particularly if the consumer has multiple trailers for towing different types of cargo.

U.S. Pat. No. 5,823,560 to Van Vleet addresses the vibration problem by modifying the actual trailer hitch. In this manner, any trailer secured to the Van Vleet device will receive the cushioning effects of the Van Vleet device. The disadvantage with the Van Vleet device is that it requires the use of a complex ball hitch assembly, which is comprised of rigid steel parts. As such, the Van Vleet device provides very limited movement and shock dampening capabilities. Accordingly, there is a need in the art for an improved trailer hitch.

It is therefore a principal object of this invention to provide a gooseneck trailer hitch that absorbs shock and vibrations from a gooseneck trailer.

Another object of this invention is to provide a trailer hitch that improves the ride of the towing vehicle by preventing vibration from transferring through a gooseneck hitch to the vehicle.

A further object of this invention is to provide a gooseneck trailer hitch with a torsion bar that absorbs vibration and other erratic forces from the trailer.

These and other objects, features, or advantages of the present invention will become apparent from the specification and claims.

BRIEF SUMMARY OF THE INVENTION

The present invention is for a gooseneck trailer hitch assembly that is mounted to the bed of a truck for hauling trailers. The assembly comprises an assembly housing having a top, bottom, sides and ends. The top has an opening that receives a ball hitch. The bottom has an opening that receives a sleeve for use in mounting the housing to the bed of a vehicle. Disposed within the housing is a torsion bar that dampens the vibration and erratic movement of the trailer from passing through to the vehicle.

DESCRIPTION OF THE PREFERRED EMBODIMENTS OF THE INVENTION

Figure 1:
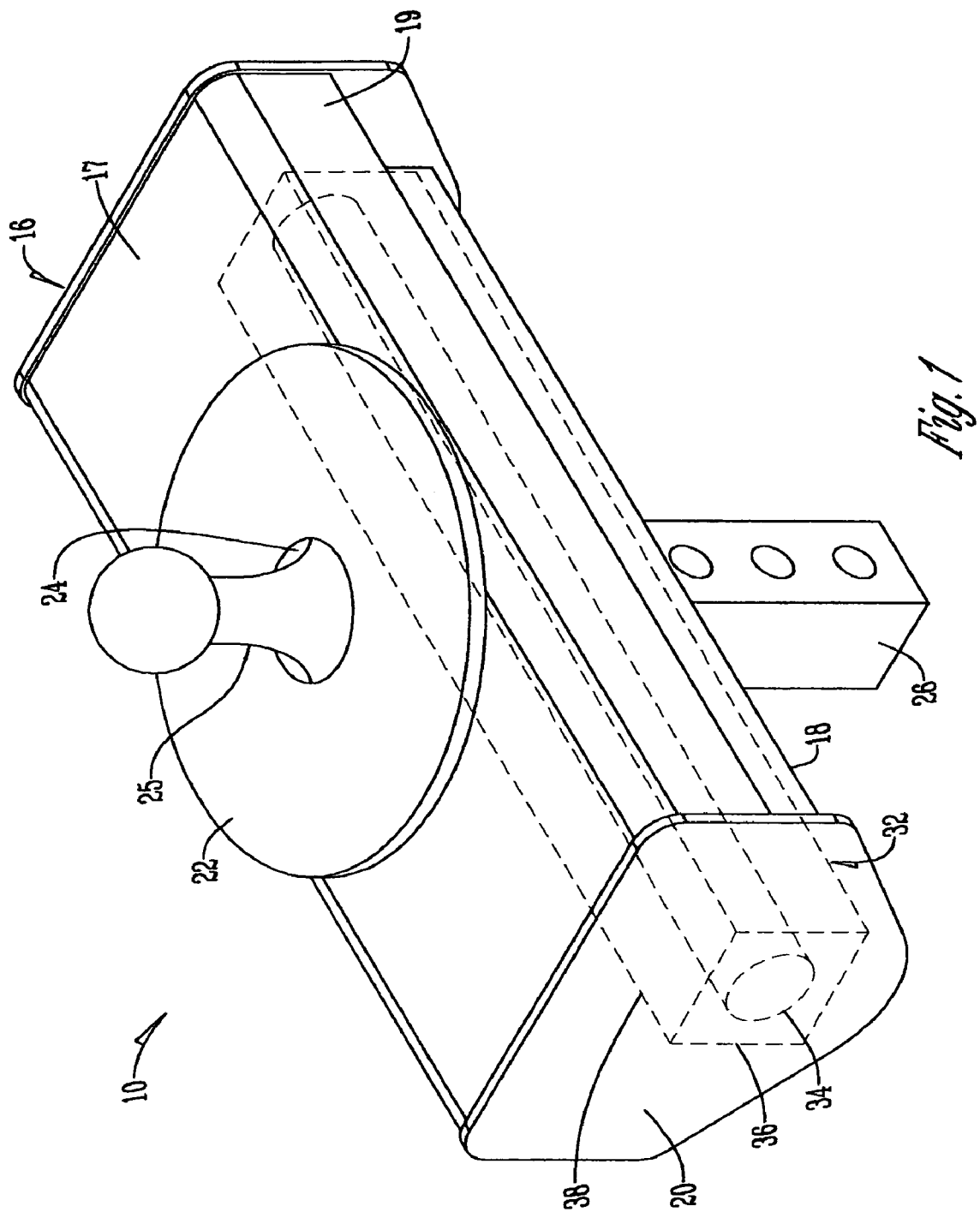
FIG. 1 is a perspective view of the hitch assembly of the present invention.
Figure 2:
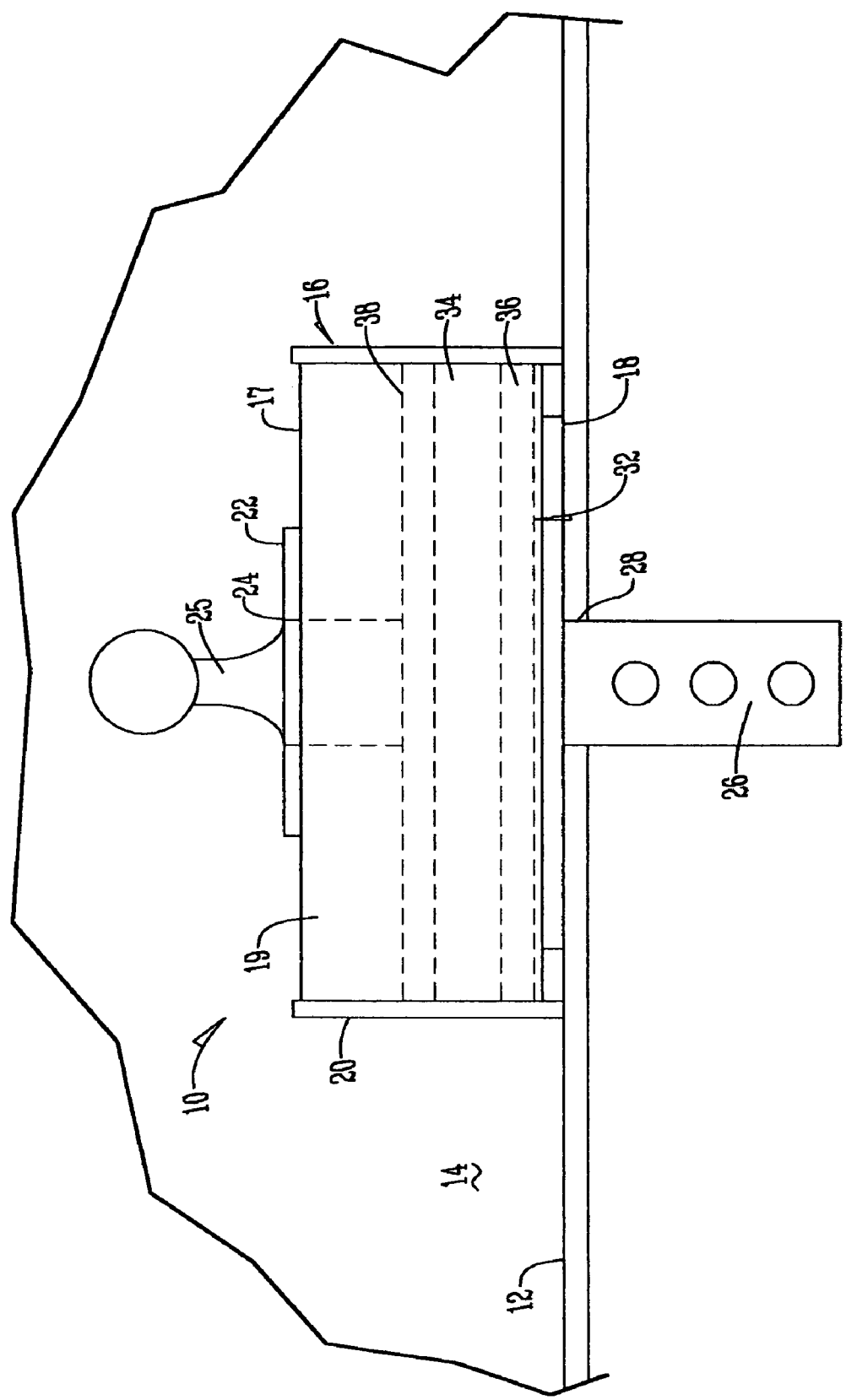
FIG. 2 is a side view of the hitch assembly of the present invention.
Figure 3:
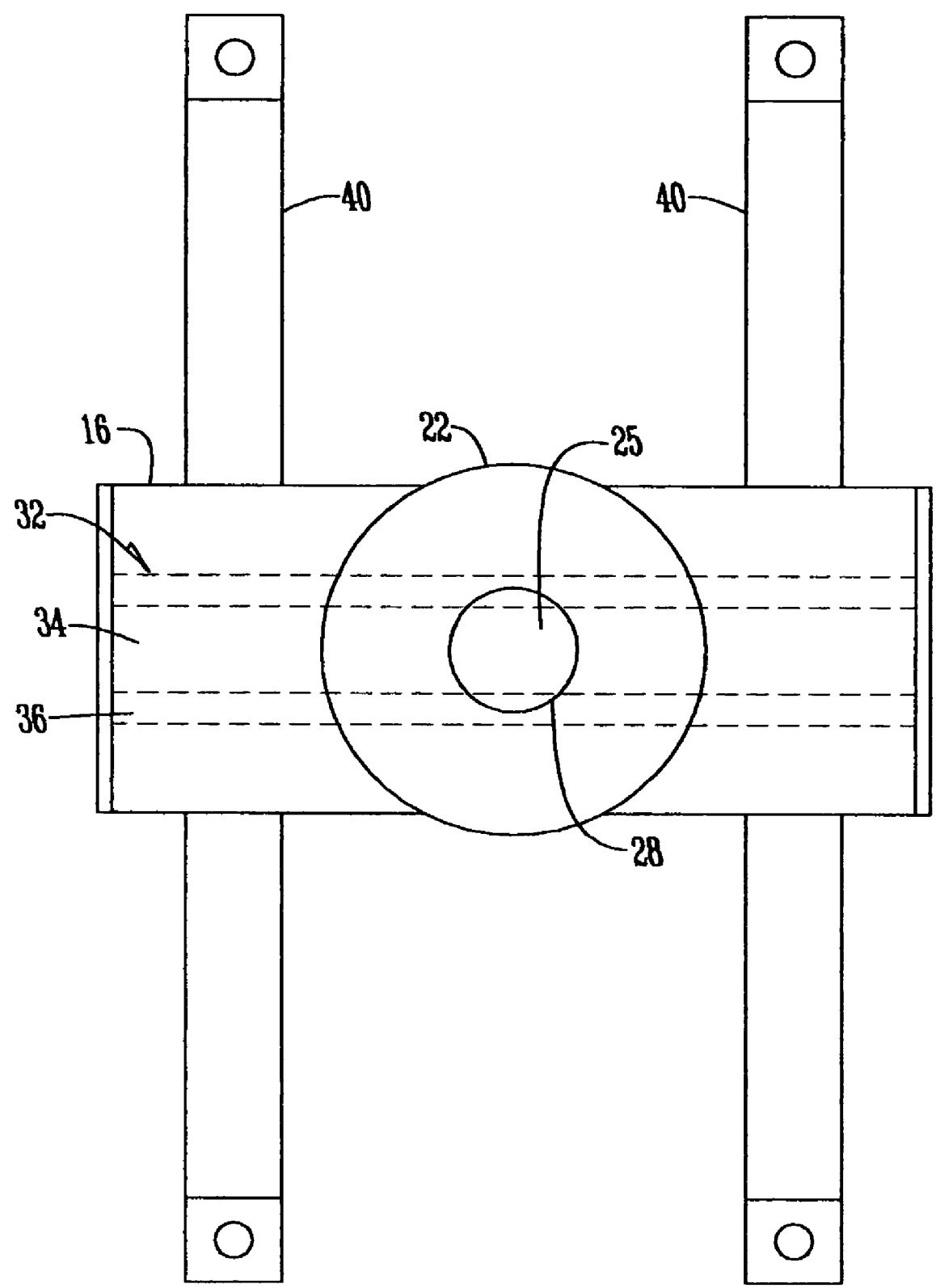
FIG. 3 is a top view of the hitch assembly of present invention.
Figure 4:
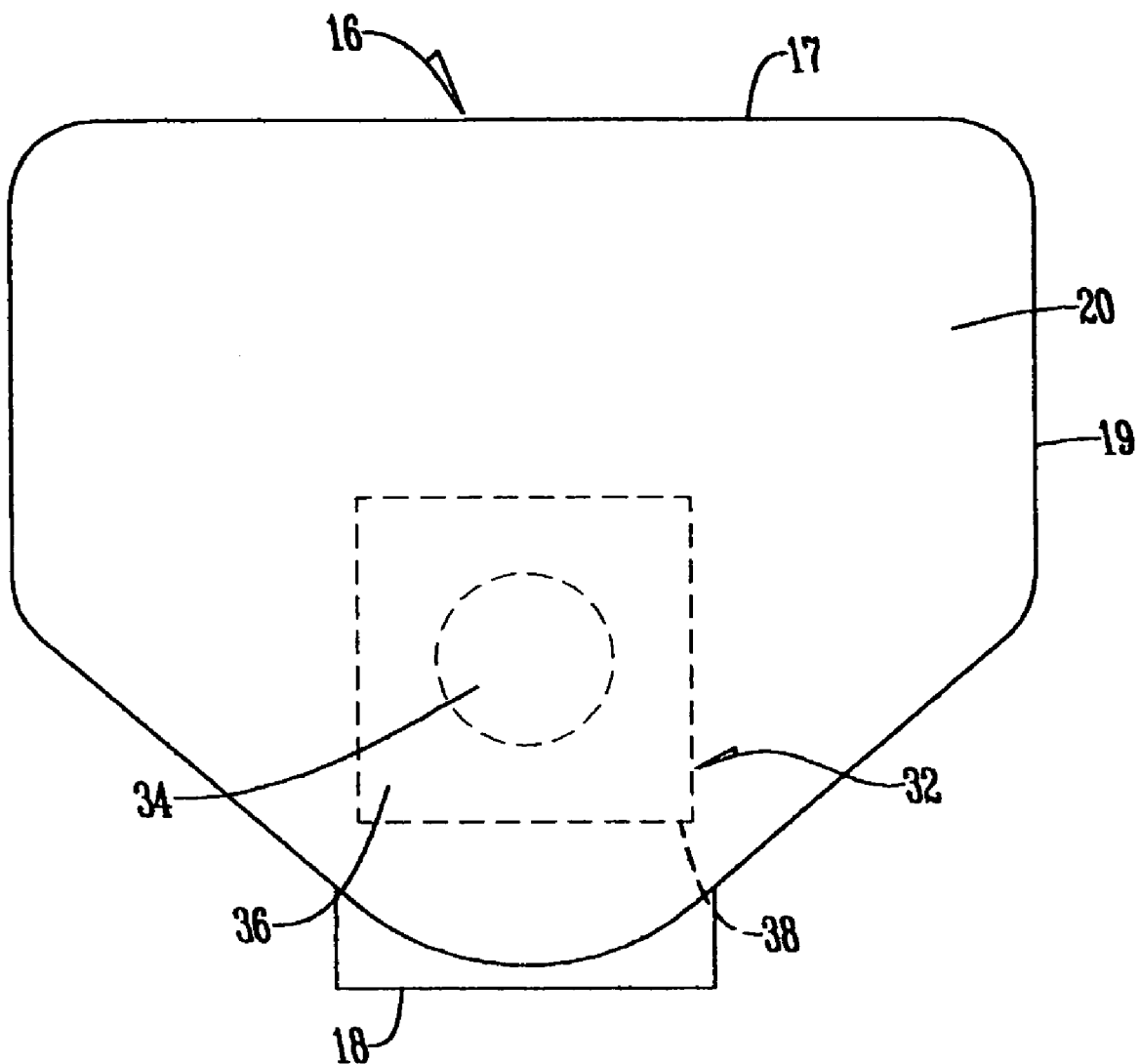
FIG. 4 is an end view of the hitch assembly of the present invention.

With reference to FIGS. 1 and 2, the gooseneck trailer hitch assembly 10 of the present invention is mounted to the bed 12 of any conventional vehicle 14. The assembly has a housing 16 having a top 17, bottom 18, sides 19, and ends 20. On the top 17 of the assembly housing 16, either attached or integrally formed to the assembly housing 16, is a generally cylindrical mounting plate 22. Centrally located in the mounting plate 22 is an opening 24 that receives a ball hitch 25 used to connect a gooseneck trailer (not shown) to the hitch assembly 10.

Mounted to the bottom 18 of the assembly housing 16 is a sleeve 26. The sleeve is received within an opening 28 in the bed 12 of a vehicle 14 for mounting the assembly housing 16 to the vehicle 14. The assembly housing 16 is of any shape.

Disposed within the housing is a torsion bar 32. The torsion bar 32 has a metallic center member 34 that extends from one end of the assembly housing 16 to the opposite end. Surrounding the center member 34 is a resilient cushioning material 36. Alternatively, the torsion bar 32 has a torsion bar housing 38 where the cushioning material 36, which is preferably made of rubber, is positioned in the spacing between the center member 34 and the torsion bar housing 38. In an additional embodiment the resilient cushioning material 36 comprises four pieces of a generally circular cross section that are compressed to fill the space between the corners of the torsion bar housing 38 and the center member 34. The ball hitch 25, that is received within the opening 24 of the mounting plate 22, engages the torsion bar 32. To provide additional mounting support, a pair of mounting brackets 40 are attached to the bottom 18 of the assembly housing 16 and are used to mount the housing to the vehicle 14.

Figure 5:
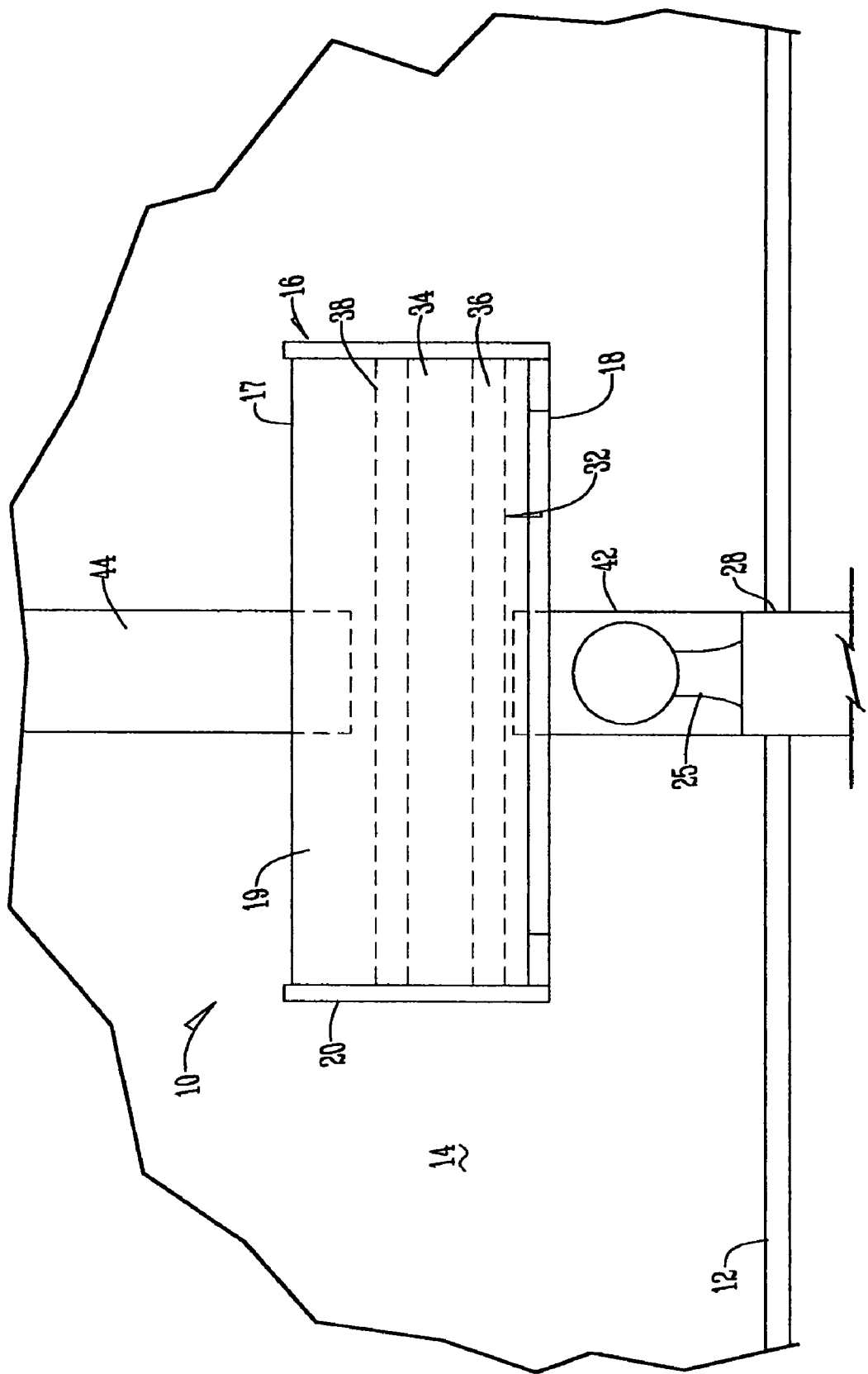
FIG. 5 is an alternative embodiment of a hitch assembly of the present invention.

FIG. 5 shows an alternative embodiment wherein the hitch assembly 10 is mounted to the mounting tube 44 that extends from the front section of a trailer. The hitch assembly is connected to the mounting tube 44 in any conventional manner such as by welding the mounting tube 44 to the top 17 of the assembly housing 16. In this embodiment a mounting sleeve 42 is received within or mounted to the bottom 18 of the assembly housing 16. The mounting sleeve 42 fits over a ball hitch 25 to connect the hitch assembly 10 to the vehicle 14. One skilled in the art—would appreciate that the hitch assembly 10 could be connected to the vehicle 14 in a number of alternative convent ional ways.

In operation, the gooseneck trailer is attached to the trailer hitch assembly at the ball hitch 25. As the trailer is transported the torsion bar 32 within the housing 16 dampens the vibration from the trailer and reduces the transfer of erratic motion from the trailer to the vehicle 14. When the trailer vibrates, the torsion bar 16 absorbs the vibration of the trailer transferred through the ball hitch 25 or the mounting tube 44 by rotating slightly which in turn compresses the resilient material 36. The compression of the resilient material 36 absorbs the vibration and other erratic movement of the trailer particularly in an up and down and forward and rearward direction.

From this description, it is therefore seen that the invention meets its stated objectives and provides for the towing of a trailer while reducing vibration and erratic movement.

What is claimed is:

1. A gooseneck trailer hitch assembly mounted to a towing vehicle comprising:
    an assembly housing operatively mounted to the towing vehicle;
    a ball hitch received within and extending out of the assembly housing; and
    a torsion bar disposed within the assembly housing and below the ball hitch such that forces to the ball hitch in a direction of travel are absorbed by the torsion bar.

2. The assembly of claim 1 wherein a sleeve is mounted to the assembly housing to facilitate mounting the assembly housing to the towing vehicle.

3. The assembly of claim 1 wherein a top of the assembly housing has a mounting plate.

4. The assembly of claim 3 wherein the mounting plate has an opening that receives the ball hitch.

5. A trailer hitch assembly mounted to the front section of a trailer comprising:
    an assembly housing operatively connected to a mounting tube of the trailer; and
    a torsion bar disposed within the housing and disposed directly above a ball hitch when the trailer is level and hitched to a towing vehicle.

6. The assembly of claim 5 further comprising a mounting sleeve mounted to a bottom of the assembly housing for mounting the assembly to the towing vehicle, said mounting sleeve being disposed directly under the torsion bar when the trailer is level.

7. A method of dampening forces in a direction of travel to a gooseneck trailer hitch assembly, the method comprising:
    (a) operatively attaching a torsion bar to a towing vehicle;
    (b) operatively, pivotally attaching a ball hitch to the torsion bar;
    (c) disposing the ball hitch at a higher elevation than the torsion bar; and
    (d) rotating a torsion bar center member relative to a torsion bar housing under the effect of forces in the direction of travel.

8. The method of claim 7 wherein operatively attaching the torsion bar to the towing vehicle comprises operatively attaching the torsion bar housing to the towing vehicle.

9. The method of claim 7 wherein operatively attaching the torsion bar to the towing vehicle comprises operatively attaching the torsion bar center member to the towing vehicle.

10. The method of claim 7 wherein disposing the ball hitch at a higher elevation than the torsion bar comprises disposing the ball hitch directly above the torsion bar when the towing vehicle is on a level surface.

11. The method of claim 7 wherein operatively attaching the torsion bar to the towing vehicle comprises:
    (a) operatively attaching a sleeve to the torsion bar;
    (b) inserting the sleeve into an opening in the towing vehicle; and
    (c) operatively connecting the sleeve to the towing vehicle.

12. A method of dampening forces in a direction of travel to a gooseneck trailer hitch assembly, the method comprising:
    (a) operatively, rigidly affixing a mounting tube to the gooseneck trailer;
    (b) operatively affixing an assembly housing to a lower end of the mounting tube;
    (c) disposing a torsion bar in the assembly housing;
    (d) disposing a mounting sleeve directly beneath the torsion bar when the gooseneck trailer is level; and
    (e) rotating a torsion bar center member relative to a torsion bar housing under the effect of forces in the direction of travel.

13. The method of claim 12 additionally comprising disposing a ball hitch inside the mounting sleeve directly beneath the torsion bar when the gooseneck trailer is level.

\* \* \* \* \*